Oct. 17, 1939.  G. J. GARRETT  2,176,399
VALVE CONTROL
Filed Feb. 9, 1938  2 Sheets-Sheet 1
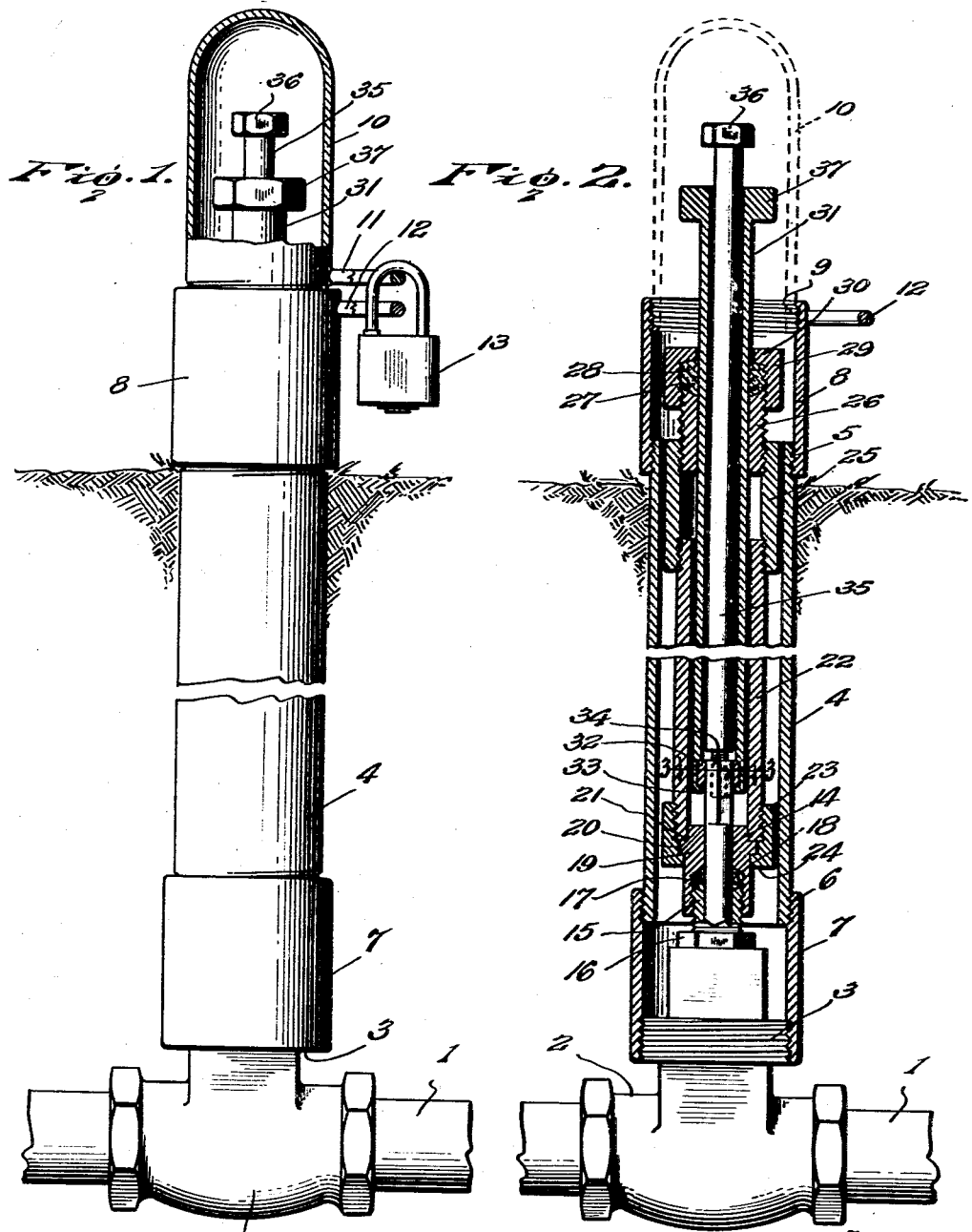
Inventor
Gilbert J. Garrett.
By Lacey & Lacey, Attorneys Oct. 17, 1939.   G. J. GARRETT   2,176,399
VALVE CONTROL
Filed Feb. 9, 1938   2 Sheets-Sheet 2
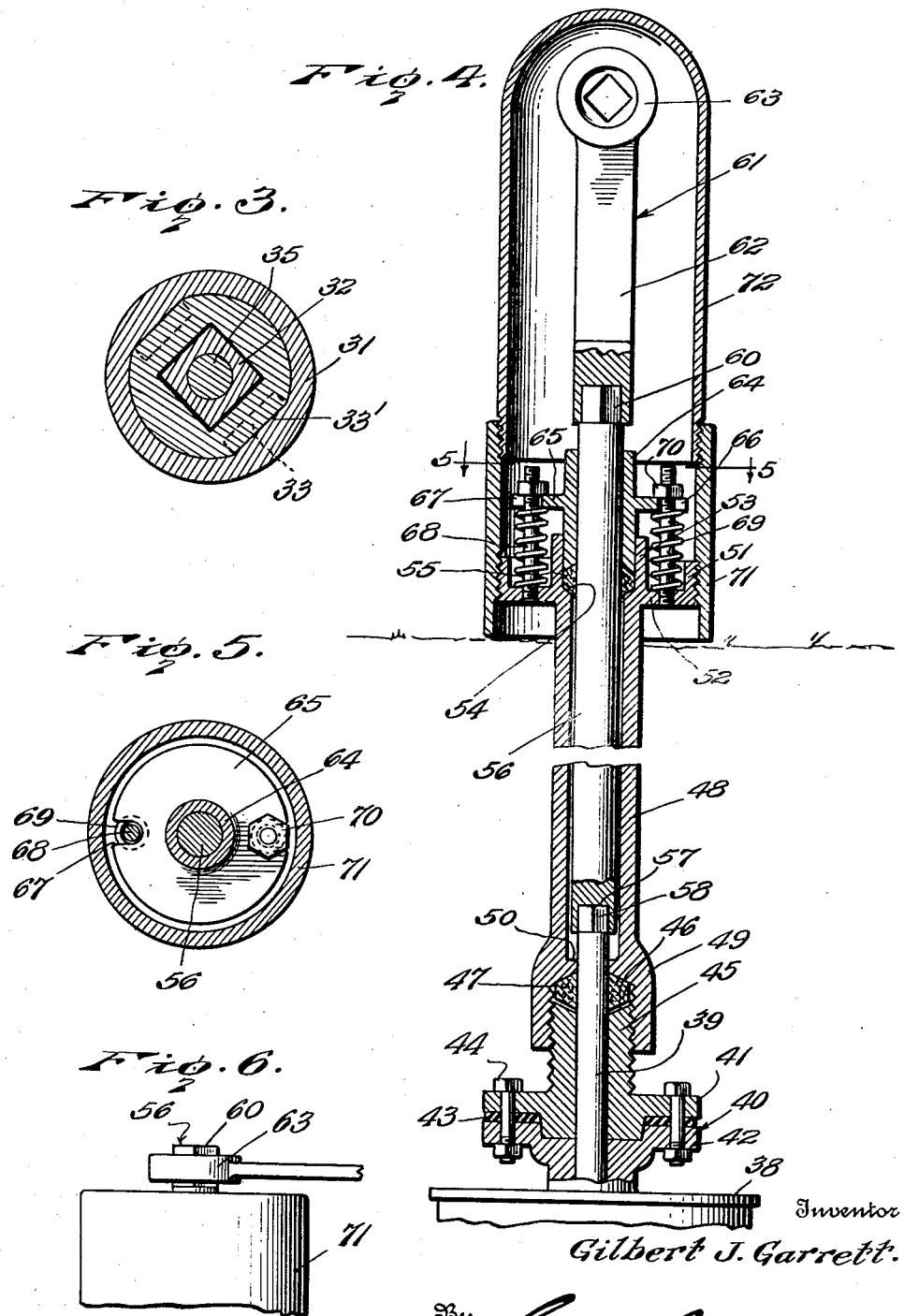
Inventor
Gilbert J. Garrett.
By Lacey & Lacey, Attorneys Patented Oct. 17, 1939

2,176,399

UNITED STATES PATENT OFFICE 2,176,399

VALVE CONTROL

Gilbert J. Garrett, Alanreed, Tex.

Application February 9, 1938, Serial No. 189,691

9 Claims. (Cl. 137—13)

This invention relates to an improved valve control and seeks, among other objects, to provide a device of this character which may be repaired without being removed from service.

Another object of the invention is to provide a valve control wherein dual packings are employed, one of said packings being adjustable for preventing leakage of fluid along the valve stem during repair or replacement of the other packing.

A further object of the invention is to provide an improved valve control employing triple sealing means so that even though the valve should become inoperative, it may be allowed to remain in the pipe line, without leakage of fluid until it is convenient to repair or replace it.

A further object of the invention is to provide a valve which may be used with stems of either the rising or non-rising type.

Another object of the invention is to provide a gate valve wherein means are employed for urging the packing clamping plate on one of the packings employed out of engagement with said packing for permitting ready removal thereof.

Still another object of the invention is to provide a valve control for permitting, from a position above the surface of the earth, the control of a valve located beneath the surface of the earth, without the necessity of providing a special compartment for the valve, which compartment forms a hazard, due to the fact that reptiles or other dangerous creatures may crawl into the compartment.

And as a still further object, the invention seeks to provide a valve control which may be repaired with facility and without the need of removing a large portion of earth or concrete in order to gain access to said valve.

Other and incidental objects of the invention will render themselves apparent during the course of the following description.

My invention is illustrated in the accompanying drawings, wherein:

Figure 1 is a side elevation showing my improved valve control as it would appear mounted on a gate valve, the upper end being partly shown in section.

Figure 2 is a vertical sectional view of my improved valve control.

Figure 3 is a horizontal sectional view on the line 3—3 of Figure 2, looking in the direction indicated by the arrows.

Figure 4 is a vertical sectional view showing a slightly modified embodiment of the invention.

Figure 5 is a horizontal sectional view on the line 5—5 of Figure 4, looking in the direction indicated by the arrows.

Figure 6 is a detail side elevation showing the wrench employed for shifting the operating stem as it would appear in operative position.

Referring now more particularly to the accompanying drawings, wherein similar reference numerals will be seen to designate similar parts, the numeral 1 indicates a pipe which may be an oil pipe line, a gas pipe line or any other fluid conductor. The pipe 1 has interposed therein a valve 2 which, as best seen in Figure 2 of the drawings, is formed with an externally threaded bonnet 3. Associated with the bonnet 3 is a tubular body 4 threaded at its upper and lower ends, as indicated at 5 and 6. A lower ring 7 has one of its ends screwed onto the bonnet 3 and the other end screwed to the threaded portion 6 of the body so that said body will be effectively connected with the bonnet. At the upper end of the body is an upper ring 8 which is screwed on the threaded portion 5 of the body 4. The upper end of the upper ring 8 is internally threaded, as shown at 9, and is adapted to have screwed therein a cover cap 10 which protects the structure within the body. In order to prevent unauthorized removal of the cover cap 10 from the body 4, there are provided loops 11 and 12, the loop 11 being secured to the cap while the loop 12 is secured to the ring 8. The loops are adapted to be vertically alined and have passed therethrough the keeper of a lock 13, which lock may be of any suitable construction.

Mounted on the upper end of the bonnet 3 of the valve 2, which is ordinarily a gate valve, and surrounding the valve stem, which is shown at 14, is a packing sleeve 15 which is adjustably mounted in the bonnet by means of an adjusting nut 16. The upper end of the packing nut 15 is concave, as shown at 17, to receive the lower portion of the packing 18. The packing sleeve 15 is threaded throughout its length and is adapted to have screwed thereon a gland nut 19. The gland nut is provided with a rib 20 near its upper end and said gland nut is adapted to be screwed down on the packing sleeve 15 for tightening the packing 18 about the stem 14 so that leakage of fluid from the valve upwardly along the stem will be prevented. The rib 20 defines a shoulder 21 and said shoulder is adapted to support the lower end portion of an inner sleeve 22. The inner sleeve 22 is threaded at its lower end and is adapted to have screwed thereon a clamping ring 23 which is formed with an inner flange 24. As best seen in Figure 2 of the drawings, the rib 20 of the gland nut 19 is adapted to be clamped between the shoulder 21 of the rib 20 and the flange 24 of the clamping ring 23. It will be understood that the clamping nut 23 cooperates with the lower end of the inner sleeve 22 for rigidly clamping the gland nut 19 so that said gland nut will be limited against rotation relative to said inner sleeve. By rotating the inner sleeve 22, the gland nut will be rotated for tightening the packing 18 about the stem 14. The clamping ring 23 is of a diameter slightly less than the inner diameter of the tubular body 4 so that said clamping sleeve will serve the additional function of guiding the inner sleeve and gland nut to proper position for screwing onto the packing sleeve 15. In this embodiment of the invention, the stem 14 is of the rising type so that, when said stem 14 is rotated, it will screw upwardly or downwardly within the gland nut 19 and through the packing 18.

The upper end portion of the inner sleeve 22 is externally threaded and has screwed thereon a guide ring 25. The guide ring 25 is internally threaded at its upper end portion and has screwed therein an upper packing sleeve 26 which has a concave upper end surface 27 to receive one end of an upper packing 28. The packing 28 is hed in place by means of an upper clamping ring 29 formed with an overhanging flange 30.

Mounted to rotate within the inner sleeve 22 is an actuating sleeve 31. As best seen in Figure 2 of the drawings, the actuating sleeve 31 extends downwardly through the flange 30 of the upper clamping ring 29, through the packing 28, through the upper packing ring 26 and through the inner sleeve 22. The actuating sleeve 31 is provided with an insert 32 which is located near the lower end of said actuating sleeve and is held in place by means of under-projecting lips 33. The insert 32 is formed with flattened sides 33' which mate with like sides on the inner surface of the sleeve 31 so that the insert will be held against rotation in said sleeve. The insert 32 is adapted to fit about the squared upper end portion 34 of the stem 14. The stem 14 is internally threaded at its upper end to receive the locking rod 35 which extends throughout the length of the actuating sleeve 31 and is provided with a nut 36 at its upper end. The actuating sleeve 31 is formed with an integral nut 37 at its upper end, which nut 37 will permit engagement with a wrench for effecting rotation of the actuating sleeve.

The operation of this embodiment of the invention is as follows: It should first be clearly understood that the valve 2 is located in a not readily accessible position, for example, beneath the surface of the earth, and that the body 4 extends from the bonnet 3 upwardly through the earth so that the upper end portion thereof will clear the surface of the earth. When it is desired to operate the valve, it is only necessary to remove the cover cap 10 from the upper ring 8 when a wrench may be engaged with the nut 37 of the actuating sleeve 31 for permitting turning of the actuating sleeve. Rotative movement of the actuating sleeve is communicated to the stem 14 through the insert 32. Inasmuch as the stem 14 is of the rising type, the squared portion 34 thereon will slide upwardly or downwardly through the insert 32 as the sleeve 31 is rotated. The nut 36 on the rod 35 will, of course, prevent displacement of the actuating sleeve 31 from the stem 14. In the course of time, the packing 18 will wear and will permit leakage of fluid along the valve stem 14 and upwardly along the actuating sleeve 31. In view of the fact that the upper packing 28 is employed, no leakage will occur and the valve may continue in use even though the lower packing is not effective. Should it be desired to repair or replace the upper packing 28, it is only necessary to rotate the inner sleeve 22, with the clamping nut 23 and the gland nut 19 thereon, for tightening the packing about the stem 14 and preventing leakage along said stem. After this is done, the upper clamping ring 29 may be unscrewed and shifted upwardly on the actuating sleeve 31 for repairing or replacing the packing 28. As the packing is generally in rope form it may be easily wound about the sleeve 31. After the packing 28 has been repaired or replaced, and the clamping nut 29 again screwed into operative position, the actuating sleeve 31 and locking rod 35 may be replaced in operative position, when the valve control will operate in the normal manner for controlling the valve stem.

Should both packings 18 and 28 become ineffective, the valve will be rendered useless for fluid controlling purposes. The cover cap 10 will, however, provide an outer seal so that the valve may be allowed to remain in service until such time as it is convenient to repair or replace it. The valve control, according to this embodiment of the invention, may be used with the Giant gate valves employed in long distance oil pipe line systems or may be employed in short private or commercial pipe lines used for conducting water, gas, or other fluid. Attention is directed to the fact that the valve may be packed from the surface of the earth even though the valve proper may be located beneath the earth, so that the need for providing special compartments for valves of this character, which compartments provide a hazard to workmen due to the fact that reptiles and other creatures often crawl into them, is eliminated. Moreover, it is not necessary to tear up large portions of concrete or earth in order to gain access to a valve to be repaired nor is it necessary to place a large portion or section of pipe line out of service at considerable cost, in the case of oil pipe lines, while a valve is being repaired.

Referring now to the modification of the invention, as shown in Figures 4, 5 and 6 of the drawings, the numeral 38 indicates the bonnet of a gate valve such as is employed in connection with long distance oil pipe line systems. The valve is provided with a non-rising stem 39 which projects through a coupling 40. The coupling 40 has upper and lower sections 41 and 42 which have interposed therebetween a gasket 43. Tie bolts 44 maintain the sections in operative sealed position. The upper section 41 has formed thereon an integral externally theraded upwardly projecting sleeve 45 which is formed with a concave upper end surface 46. Packing 47, which is shown as loosely surrounding the stem 39, has its lower face overlying the concave face 46 of the sleeve 45. As best seen in Figure 4, the valve 38 is preferably mounted beneath the surface of the earth and has associated therewith a valve control mechanism which includes a body 48. The body 48 has an enlarged lower end portion 49 which is internally threaded and is adapted to screw on the externally threaded sleeve 45. The enlarged lower end portion is hollow throughout practically its entire length but has, at the junction of the body proper and the enlarged lower end portion 49, a web or partition 50 which rotatably receives the stem 39 therethrough. The partition 50 has an inclined lower surface which cooperates with the concave face 46 for compressing the packing 47 into tight surrounding relation to the stem 39. The body 48 is adapted to have its upper end portion located above the earth and, as best seen in Figure 4, said upper end portion is formed with an integral externally threaded ring 51 which is connected to the body 48 by means of a web 52. Formed on the body 48 above the web 52 is a sleeve portion 53 defining a socket 54 for the reception of packing 55.

Operatively mounted in the body 48 and extending throughout the major portion of the length thereof, is an actuating rod 56. The rod 56 is formed at its lower end portion with a squared socket 57 which is adapted removably to receive the squared upper end portion 58 of the stem 39. The upper end portion of the rod 56 is squared, as shown at 60, and said squared portion 60 is adapted, in operative position, to receive a ratchet wrench for permitting rotation of the rod. The ratchet wrench is shown generally at 61 and it will be seen to include a handle portion 62, which handle portion is formed at its free end with a squared socket to receive, when in inoperative position, the squared portion 60 of the rod 65. At 63 is shown the ratchet end of of the wrench which is applied to the squared portion 60 when it is desired to rotate the rod 56.

In order to retain the packing 55 in place and yet permit ready removal thereof, I employ a packing compressing sleeve 64 adapted to surround the rod 56 and extend into the sleeve portion 53 into engagement with the packing 55. The lower end portion of the packing compressing sleeve is concave so as to cooperate with the concave surface 54 for urging the packing toward the stem 56. Formed integral on the packing compressing sleeve 64 is a ring 65 having diametrically disposed cut away portions 66 and 67. Mounted on the web 52 and extending upwardly through the cut away portions 66 and 67 are tie bolts 68. Coil springs 69 surround the tie bolts 68 and, as will be seen, are located between the web 52 and the ring 65. Nuts 70 are screwed on the bolts 68 into engagement with the upper surface of the ring 65. It will be seen that by tightening the nuts 70, the packing compressing sleeve will be urged downwardly against the tension of the springs 69 for urging the packing into tight engagement about the rod 56. Should it be desired to remove the packing 55, it is only necessary to loosen the nuts 70 when the spring 69 will urge the ring 65 and sleeve 64 upwardly for freeing the packing 54. In order to protect the upper end portion of the body 48, I provide an outer ring 71 adapted to be screwed onto the ring 51 and which extends upwardly to completely surround the ring 65 and its associated mechanism. A cover cap 72 is adapted to be screwed into the ring 71 and said cap 72 serves to protect the handle 61 and also provides an additional seal, as will be described hereinafter. Loops similar to the loops 11 and 12 may be employed on the cap 72 and the ring 71 so that a lock, similar to the lock 13, may be employed for preventing unauthorized removal of the cap from the ring.

In operation, the packings 47 and 55 normally prevent escape of liquid from within the bonnet exteriorly of the valve. Should the packing 55 become in need of replacement it is only necessary to rotate the body 48 which will effectually clamp the packing 47 in tight engagement about the stem 39. After this is done, the nuts 70 may be removed for permitting withdrawal of the packing clamping sleeve 64 and the packing 55. After the packing 55 has been replaced, the body 48 may be rotated slightly in a counterclockwise direction, if necessary, to remove pressure on the packing 47. The valve and valve control may then operate in the normal manner. As in the preferred form of the invention, should both the packings 47 and 55 become worn to such an extent that it is impossible to effect repair of the valve, the valve may be allowed to remain in service until such time as replacement or repair may take place, due to the fact that the cover cap 72 will effectually prevent escape of liquid or fluid from the valve proper.

Attention is particularly directed to the fact that, if desired in both embodiments of the invention, a suitable anti-freeze solution may be placed within the body to prevent freezing in the event there is an escape of liquid about the stem of the valve. It is thought that the construction and operation of the invention, in both of its embodiments, will be clearly understood.

Having thus described the invention, what I claim is:

1. A device of the class described including, in combination with a valve having a bonnet, a tubular body, means connecting the body with the bonnet, said valve having a stem, means carried within the body and connected with the stem for permitting rotation of the stem at a point remote therefrom, and packing means carried by the body at its opposite ends and being adjustable by rotation of the body.

2. In a valve control, in combination with a valve having a stem and a bonnet, a tubular body, a lower ring connecting the body to the bonnet, a packing sleeve about the stem, a gland nut, a packing between the packing sleeve and gland nut, an inner sleeve carried within the body, a clamping nut connecting the gland nut to the inner sleeve, said packing sleeve being adapted to guide the inner sleeve and gland nut to operative position, a guide ring carried by the inner sleeve, an upper packing sleeve carried by the guide ring, a second packing carried by the upper packing sleeve, an actuating sleeve carried within the inner sleeve and extending through the upper packing, means removably connecting the actuating sleeve with the valve stem, and means retaining the actuating sleeve in position on the valve stem, said actuating sleeve permitting operation of the valve from a remote point.

3. In a valve control, a tubular body, a lower ring connecting the body to a valve bonnet, an inner sleeve carried by the body, a gland nut carried by the inner sleeve and adapted to surround a valve stem, an actuating sleeve carried within the inner sleeve, and a locking rod carried within the actuating sleeve, said actuating sleeve being engageable with the valve stem for permitting operation of the valve at a point remote therefrom.

4. In a valve control, a body, a lower ring connecting the body to a valve bonnet, an upper ring carried by the body, an inner sleeve carried within the body, a gland nut carried by the inner sleeve and adapted to surround a valve stem, said gland nut being rotatable with the inner sleeve for clamping a packing nut about the valve stem, an upper packing sleeve carried by the inner sleeve, an upper clamping ring carried by the upper packing sleeve, packing carried by the upper packing sleeve and clamping ring, an actuating sleeve carried within the inner sleeve and slidable through the last mentioned packing, means removably connecting the actuating sleeve with the valve stem, means locking the actuating sleeve against removal from the valve stem, and a cover cap carried by the body at its upper end, said actuating sleeve providing means for operating the valve from a remote point and said packings preventing leakage of fluid from the valve, said cover cap providing an outer cover for the body.

5. In a device of the class described, in combination with a valve having a bonnet, a rising stem and a packing sleeve, a tubular body, means connecting the body to the bonnet, an inner sleeve, a gland nut carried by the inner sleeve and the packing sleeve, packing carried between the gland nut and the packing sleeve, said inner sleeve being rotatable for rotating the gland nut and tightening the packing, an actuating sleeve within the inner sleeve, an insert carried by the actuating sleeve for operatively connecting said actuating sleeve with the valve stem, said insert permitting rising of the valve stem within the actuating sleeve, a locking rod carried by the valve stem within the actuating sleeve and having a nut thereon, said locking rod and nut preventing accidental displacement of the actuating sleeve from the valve stem, a guide ring carried by the inner sleeve, an upper packing sleeve carried by the guide ring, an upper clamping ring carried by the upper packing sleeve, a second packing carried between the last mentioned clamping ring and packing sleeve, said last mentioned packing surrounding the actuating sleeve, an upper ring carried by the body, and a cover cap carried by the upper ring and surrounding the upper end of the actuating sleeve and locking rod for providing protection therefor, said actuating sleeve permitting operation of the valve at a point remote therefrom.

6. In a device of the class described, the combination with a valve having a bonnet, a valve stem, and a packing sleeve, a body, means connecting the body with the bonnet, an inner sleeve within the body, a gland nut carried by the inner sleeve and screwed onto the packing sleeve, a packing between the gland nut and the packing sleeve, said packing being adapted to be depressed by rotation of the inner sleeve and gland nut, a second packing carried by the inner sleeve at its opposite end, an actuating sleeve, an insert carried by the actuating sleeve and connecting said actuating sleeve with the valve stem, said insert permitting raising of the valve stem within the actuating sleeve, and means locking the actuating sleeve and insert against displacement from the stem, said actuating sleeve being adapted to rotate the valve stem at a point remote therefrom.

7. In a device of the class described, in combination with a valve having a stem, a bonnet and a coupling, said coupling having an integral packing sleeve, a body carried on the packing sleeve of the coupling and having a ring, a web connecting the ring with the body, a packing disposed between the body and the packing sleeve and about the valve stem, said body being adapted to be rotated for clamping the packing tightly about the stem whereby leakage along the stem will be prevented, a sleeve portion formed on the body and defining a packing receiving socket, a second packing carried in the socket, an actuating rod carried in the body and engageable with the valve stem, and means surrounding the rod and engageable in the socket for retaining the second packing in place, said actuating rod permitting operation of the valve at a point remote theerfrom, said first mentioned packing being adapted to retain fluid within the valve during repair to said second mentioned packing and said second mentioned packing being repairable without removal of the valve from its position.

8. In a device of the class described, in combination with a valve having a stem and a coupling, a body carried on the coupling, a packing disposed between the body and coupling, said body having a sleeve portion defining a socket, a second packing in the socket, an actuating rod in the body and extending through the second mentioned packing into engagement with the valve stem to rotate therewith, a packing compressing sleeve carried in the socket and having a ring provided with cut away portions, tie bolts in the cut away portion and connecting the ring and compressing sleeve with the body whereby the second mentioned packing may be compressed about the actuating rod, and springs on the tie bolts for releasing the compressing sleeve upon loosening of the tie bolts for permitting access to the second mentioned packing.

9. In a device of the class described, in combination with a valve having a stem and a coupling, a body carried by the coupling, an actuating rod in the body, an outer ring carried by the body, a packing surrounding the actuating rod, said actuating rod being connected with the stem for permitting operation of the valve from a remote point, means retaining the packing in operative position surrounding the actuating rod, said means being removable for permitting access to the packing, and a cover cap carried by the outer ring and providing an outer seal for the valve.

GILBERT J. GARRETT.